3,360,493
HYDRAULIC CEMENT COMPOSITIONS AND METHODS

Robert M. Evans, Shaker Heights, Ohio, assignor to The Master Mechanics Company, Cleveland, Ohio, a corporation of Ohio
No Drawing. Filed Mar. 11, 1966, Ser. No. 533,424
28 Claims. (Cl. 260—29.6)

ABSTRACT OF THE DISCLOSURE

Cement, mortar and concrete compositions having higher flexural and tensile strengths are produced by incorporating into the cement mix 2.5% to 33.3%, based on the weight of the cement, of finely divided solids of a film-forming copolymer of a liquid comprising vinyl acetate and an alpha-olefin of 2 to 3 carbon atoms, and preferably some unsaturated carboxylic acids.

---

The present application is a continuation-in-part of my application Ser. No. 432,831 filed Feb. 15, 1965 (now abandoned) and the invention relates to a novel cementitious composition, a method of making and using the same, and a masonry coating formed of such composition having resistance to hydrolysis by aqueous media and having a high adhesive strength.

Heretofore, polyvinyl acetate has been employed in paint compositions, and attempts have been made to reduce its sensitivity to water. It has also been used in some cement compositions to improve the tensile strength, but it has serious disadvantages because it is subject to attack by acids and tends to hydrolyze when in contact with water. For this reason polyvinyl acetate is not satisfactory or cementitious coatings which are continually subjected to aqueous media or to weak acids.

The needed resistance to hydrolysis can be obtained in a cementitious material by using a polyacrylate latex as disclosed in my application Ser. No. 344,827, now U.S. Patent No. 3,196,122 (originally filed in 1955). This process has been used for a decade. Because the problem has been solved so well in this manner, those skilled in the art considered polymers of vinyl acetate as being undesirable and impractical in concrete floor covering materials which were continually wetted with water.

Applicant has now discovered that polyvinyl acetate copolymers can be provided with adequate resistance to hydrolysis by employing a comonomer, such as ethylene or propylene, and that such copolymers are in some respects more desirable that acrylate polymers or copolymers in a cementitious masonry composition because they can be dried economically in a conventional spray drier without sintering. Thus, it becomes possible to package and sell dry premixed cement compositions which require only the addition of water before they are used. Shipment of the individual ingredients in dry form also reduces shipping costs.

The copolymers used in the cementitious compositions of this invention are formed by emulsion polymerization of 20 to 80 percent by weight of vinyl acetate and 80 to 20 percent by weight of at least one alkylene monomer, such as ethylene or propylene, using a conventional emulsifying agent and conventional polymerization procedures. A substantial amount of the copolymer, either in latex form or as a spray-dried material, is mixed with a hydraulic cement and various other ingredients (as described, for example in said Patent No. 3,196,122), such as sand or aggregate, and additional water, if needed, to provide a flowable mixture suitable for forming a mortar or a floor- or wall-covering layer. The copolymer is used in a suitable amount to provide the desired tensile strength, adhesive strength and resistance to hydrolysis.

A small proportion of the monomers used to form the copolymer latex (i.e., in addition to the vinyl acetate and the alkylene monomer) is preferably a copolymerizable ethylenically unsaturated acid having one or more carboxyl groups, such as maleic anhydride, fumaric acid, itaconic acid or other ethylenically unsaturated dicarboxylic acids, half esters thereof, an acrylic or methacrylic acid or other monocarboxylic acids, or the like. A small proportion of depending carboxyl groups in the copolymer gives better adhesion to cementitious and metallic surfaces.

The novel cement composition of this invention is particularly well suited for use in factory floors or in repairing damaged floors. For such uses, a high percentage of ethylene or propylene is desirable to provide a high resistance to hydrolysis. The composition is also well suited for use in forming relatively thick coatings on masonry walls, in which case a higher percentage of vinyl acetate is usually desirable to improve adhesive strength and tensile strength. Because of its excellent tensile strength, the composition of this invention is also suitable as a mortar for brick walls which are pre-laid before being hoisted to the proper position on the building.

An object of the invention is to provide an improved cementitious composition which can be made economically and packaged in dry form.

A further object of the invention is to provide a cementitious composition which may be premixed and stored in dry form.

A still further object of the invention is to provide a cement composition which adheres well to cementitious and metallic surfaces.

Another object is to provide an inexpensive concrete composition suitable for factory floors which are continually wet with water.

Another object of the invention is to provide a cementitious composition suitable for coating masonry walls and for repairing concrete structures.

Other objects, uses and advantages of the invention will become apparent to those skilled in the art from the description and claims which follow.

It is known that the tensile strength of a sand-Portland cement mortar is increased by adding a latex made from polyvinyl acetate and that, unlike ordinary cement, the latex-modified mortar will adhere strongly to a concrete surface. However, if such latex-modified cement is soaked with water, it will swell as much as 1 percent; its tensile strength will drop considerably below that of an unmodified cement; and it will lose its bond to concrete. The reason for this is that the polyvinyl acetate has been saponified by the caustic soda which is part of Portland cement, and the resulting polyvinyl alcohol residue is water soluble. As explained on pages 1661 and 1662 of the December 1959 issue of "Official Digest." teh polyvinyl acetate homopolymers or copolymers are sensitive to attack by calcium, sodium or potassium hydroxide solutions. Thus, polyvinyl acetate reacts with calcium hydroxide to form polyvinyl alcohol and calcium acetate, both of which are water soluble.

The cementitious composition of this invention employs a latex formed by copolymerizing vinyl acetate with ethylene or propylene which makes it possible to formulate a mortar which will not lose its strength when it is wet.

Similar advantages are obtained using polyacrylate latices as disclosed in my Patent No. 3,196,122, but such latices cannot be dried economically in a conventional spray drier because they would sinter; and therefore, they are usually packaged in wet form separate from the hydraulic cement. The vinyl acetate-ethylene copolymer latex has a distinct advantage over polyacrylate latex because it can be spray dried. Because the copolymer latex contains a substantial proportion of polyvinyl acetate, the absorbed water acts as a plasticizer. Such water helps sintering and does not evaporate until after the film has formed. Therefore, such copolymer latex can be economically dried in a conventional spray drier and premixed with the hydraulic cement and all the other ingredients (except water) before packaging. It will not sinter until mixed with water. Also, there is an obvious advantage in shipping a dry material because it weighs less than the wet latex.

The term "copolymer" is used herein in the normal generic sense to cover terpolymers, tetrapolymers and other polymers of two or more copolymerizable monomers.

The cementitious composition of the present invention is quite similar to that of my Patent No. 3,196,122 but the polyacrylate latex is replaced by a latex of a polymer of 20 to 80 percent by weight of vinyl acetate and 80 to 20 percent by weight of at least one alkylene having 2 to 3 carbon atoms, such as ethylene, propylene, or mixtures thereof. The monomers used to form the copolymer preferably comprise essentially vinyl acetate and ethylene and/or propylene and may include a small proportion of other copolymerizable monomers, particularly monoethylenically unsaturated carboxylic acids, such as acrylic acids. It is usually preferable to employ no more than 10 or 20 percent of monomers other than vinyl acetate, ethylene and propylene, but it will be apparent that advantages of the invention can be obtained using larger amounts of other monomers. The other monomers may, for example, be alkyl acrylates, alkyl methacrylates, acrylonitrile, maleic esters, fumaric esters and various other copolymerizable vinyl compounds.

The proportions of the various monomers which will give the best results depend on the proposed use of the cementitious compositions. In general, at least 20 percent and no more than 80 percent by weight of the monomers used to form the terpolymer, tetrapolymer or other copolymer for the cementitious composition of this invention is vinyl acetate and at least 20 percent and no more than 80 percent by weight of such monomers is either ethylene or propylene or mixtures thereof.

It is usually preferred to use a copolymerization product or copolymer of 25 to 75 percent by weight of vinyl acetate and 75 to 25 percent by weight of either ethylene or propylene or mixtures thereof. If the cementitious composition must provide high tensile strength and high adhesive strength, as when used as a coating for masonry walls, then it is preferable to use a copolymer of 40 to 80 percent by weight of vinyl acetate and 60 to 20 percent by weight of the alpha-olefin or alpha-olefins. If the cementitious composition must provide excellent resistance to hydrolysis by aqueous media and to attack by acids, as when used in a floor for a processing plant, then it is preferable to use a copolymer of 40 to 80 percent by weight of ethylene or propylene or mixtures thereof and 60 to 20 percent by weight of vinyl acetate.

It is desirable to employ copolymers of at least 40 percent by weight of vinyl acetate and no more than 60 percent by weight of the alpha-olefin or alpha-olefins because this facilitates the spray drying and also permits better plasticizing by absorbed moisture.

The useful copolymers include terpolymers, tetrapolymers and other polymers, particularly terpolymers of vinyl acetate, an alpha-olefin, and a copolymerizable ethylenically unsaturated carboxylic acid, such as an acrylic acid, a methacrylic acid, a dicarboxylic acid or a half ester of a dicarboxylic acid. The unsaturated carboxylic acid may be acrylic acid, chloroacrylic acid, methacrylic acid, ethyl acrylic acid or other alpha- or beta-substituted acrylic acid having preferably less than 10 carbon atoms; maleic anhydride, fumaric acid, itaconic acid or similar unsaturated dicarboxylic acid; or a monoester of maleic, fumaric or itaconic acid, such as a methyl-, ethyl-, propyl-, butyl or other alkyl monoester of such acid having preferably no more than 8 carbon atoms in the alkyl group. The halogen-substituted derivatives of such carboxylic acids, may also be employed, such as chloromaleic acids.

The preferred amount of the copolymerizable carboxylic acid to be used during the polymerization will vary depending on various factors including the rate of copolymerization with the other monomers. The amount should not exceed 20 mol percent and preferably does not exceed 10 mol percent. Good results can be obtained, for example, when such acid constitutes 0.5 to 10 percent of the monomers used to form the vinyl acetate-alkylene copolymer. The polymer used in the cementitious composition of this invention may, for example, be a copolymer of about 25 to 75 percent by weight of vinyl acetate, about 75 to 25 percent by weight of ethylene and/or propylene, 0.5 to 10 percent by weight of a copolymerizable mono- or dicarboxylic acid, and 0 to 20 percent by weight of one or more other copolymerizable monomers, such as acrylonitrile, an alkyl acrylate, an alkyl methacrylate, or other vinyl compounds, particularly those having a terminal $CH_2=CH<$ group. More specifically the copolymer may be a terpolymer of 40 to 70 percent vinyl acetate, 30 to 59 percent ethylene or propylene and about 1 percent of acrylic or methacrylic acid or a terpolymer of 40 to 70 percent vinyl acetate, about 30 to 60 percent ethylene, and 0.5 to 5 percent of maleic or fumaric acid.

The amount by weight of the vinyl acetate or the alpha-olefin may be anywhere from 25 to 75 percent, and good results can be obtained, for example, when 0.5 to 4 percent by weight of the monomers used to form the terpolymer are an acrylic acid having 3 to 4 carbon atoms, such as acrylic acid, methacrylic acid or chloroacrylic acid. It is often desirable, particularly in a wall covering composition, to employ 1 or 2 percent by weight of acrylic or methacrylic acid, whereby an insitu thickener is polymerized into the copolymer chain. Substantially greater amounts of the acid monomer may, of course, be used.

In order to obtain an alkylene-vinyl acetate copolymer having depending carboxyl groups, any copolymerizable monomer may be employed which has such carboxyl groups or which produces such groups. Thus, it is within the purview of this invention to employ a vinyl cyanide monomer, such as acrylonitrile or a chloro-, methyl- ethyl or other alkyl derivative thereof which produces the necessary carboxyl groups by hydrolysis, rather than an acid monomer, although it is preferable to employ the carboxylic acid monomer rather than the vinyl cyanide comonomer alone for this purpose.

The monomers used to form the alkylene-vinyl acetate copolymer used in the composition of this invention may include both a vinyl cyanide and a carboxylic acid. For example, the copolymer may be made by copolymerizing about 25 to 75 parts by weight of vinyl acetate, about 25 to 75 parts by weight of ethylene and/or propylene, 0.5 to 10 parts by weight of a copolymerizable unsaturated carboxylic acid, and a small amount (preferably 1 to 10 parts by weight) of acrylonitrile.

In selecting the proportions of the various monomers used to form the copolymer, it must be remembered that the copolymer should form a film at ambient temperature so that it is unnecessary to heat the cementitious composition before applying it. The proportions should be selected to provide a film-forming copolymer—that is, a copolymer which forms a film at ambient temperature or below. Of course, the absorbed moisture acts as a plasticizer and thus facilitates forming of the film at room temperature.

Conventional polymerization procedures may be employed to form the copolymers used in the composition of this invention, and the method of preparation of the copolymer forms no part of this invention. The copolymer is formed by a conventional type of emulsion polymerization preferably using conventional non-ionic emulsifiers, such as alkylphenoxypolyethoxyethanols having alkyl groups of 7 to 12 carbon atoms and other emulsifiers disclosed in U.S. Patent No. 2,795,564. If desired, the emulsifier can, for example, be a mixture of 80 to 90 percent by weight of a non-ionic emulsifier and 10 to 20 percent by weight of an anionic soap.

The polymerization is preferably effected in a reactor which is maintained under a pressure of several hundred pounds per square inch, and, if desired, extremely high pressures in excess of 2500 pounds per square inch may be used. If the pressure is extremely high, the polymerization can be effected without a catalyst, but it is usually preferable to employ a catalyst to reduce the pressure necessary in the reactor and to reduce the polymerization time while increasing the degree of conversion. Excellent results can be obtained using as a catalyst, a very small amount of a colloidal suspension of hydrogen containing palladium and a peroxy initiator compound such as cumene hydroperoxide, benzoyl peroxide, hydrogen peroxide, sodium persulfate, potassium persulfate or the like. Because the palladium is very expensive, it is desirable to minimize the amount used. For example, good results can be obtained using an amount of colloidal suspension of hydrogenated palladium equal to about .001 to about .01 percent of the weight of the monomers. Even smaller amounts can be used to advantage. When using such a cooperative catalyst system, the pressure in the reactor may, for example, be maintained between 500 and 1000 p.s.i. while still obtaining an adequate rate of polymerization.

Various conventional methods may be employed to hydrogenate the palladium. One suitable method is to neutralize palladium chloride with potassium hydroxide in a medium, such as water or a solvent, and thereafter to hydrogenate the material.

The stability is improved if the solids content during polymerization is kept at 50 percent or below, and it is, therefore, desirable to provide a solids content between about 35 percent and about 50 percent by weight during polymerization. Excellent results are obtained, for example, when using a solids content of 38 percent.

The temperature employed during the polymerization can be varied considerably as will be apparent to those skilled in the art. If desired, cooling means may be provided to prevent overheating. The polymerization temperature is usually between 50° and 100° C. but may be 120° C. or considerably higher. A constant temperature is not essential but may be maintained if desired.

It is usually preferable to use a batch polymerization system or a delayed addition system rather than a continuous polymerization system. When using a non-continuous system, it is preferable to obtain a conversion of monomer to polymer of at least 50 percent and preferably 60 to 99 percent. In commercial production it is usually desirable to have a conversion of at least 90 percent.

After the desired degree of conversion has been obtained, the resulting polymerization product can be removed from the reactor, after venting the reactor to atmospheric pressure. The amount of water in the resulting latex can be reduced to increase the solids content, or the latex can be dried in a conventional spray drier in the conventional way. Thereafter the copolymer latex or the dried copolymer can be mixed with hydraulic cement, sand and other ingredients to provide the desired cementitious composition. The type of formulation which will provide best results depends on the use to which the composition is put. The various materials which are mixed with the copolymer may be the type described in my Patent No. 3,196,122. Examples of suitable hydraulic cements are the various Portland cements, the white cements, the natural cements, puzzolanic cements (including cements derived from industrial slags), aluminous cements, and in general, all of the commercially available hydraulic cements. Also included are hydraulic limes and similar materials.

Various types of fine and coarse aggregates may be used if desired. The type of aggregate used depends on the intended use of the product. For masonry paints or plasters, it is often advantageous to incorporate sand in the mixture. Such sand may be almost any type of sand having a small particle size, preferably one having a diameter of one millimeter or less. Where the product is subject to more exacting requirements, as for example, in the case of a cement patch applied to an existing concrete floor, graded sands of medium particle size such as "Ottawa sand" and "Best" sand or a mixture of the two may be preferred. Ottawa sand is a silica sand of the type referred to as "round," and Best sand is of the type known as "sharp." It will be understood of course, that it is possible to use other aggregates including ground glass, emery powder, ground slag or fine gravel. In concrete mixes, it is often desirable to employ coarse aggregate, and excellent results are obtained using crushed trap rock.

When the cementitious composition of this invention employs sand or fine aggregate, the ratio of the sand or fine aggregate to the cement is preferably from 3:1 to 1:3. When a concrete mix is prepared for making a floor and employs a mixture of sand, cement and coarse aggregate, the preferred ratio of sand to cement is from 1:1.8 to 1:2.5, and best results are usually obtained when such ratio is about 1:2.

It is usually desirable to incorporate in the cementitious composition various additives in addition to the copolymer and the hydraulic cement, particularly those disclosed in said Patent No. 3,196,122. The possible additives include protective colloids, antifoaming agents, water reducing agents, antimycotics and thickeners. Suitable protective colloids include casein, carboxymethyl cellulose, sodium polyacrylate, ammonium caseinate or the like. Suitable antifoaming agents include long chain alcohols, such as dray wax, lauryl alcohol, stearyl alcohol or the like and various silicones. The water reducing agent or cement dispersing agent may be purified sodium lignin sulfonate or other purified ligno sulfonates, salts of hydroxylated carboxylic acids and the like. The antimycotic may be a sodium phenate or chlorophenate or other water-soluble mercurials. A suitable thickener, such as an aqueous suspension of polyacrylic acid or the like, may be used, especially in wall coating compositions. Also, acrylic or methacrylic acid may be copolymerized with the vinyl acetate and the alkylene to provide an "in situ" thickener.

If the cementitious composition is to be used for making a concrete floor or a hard rigid coating of substantial thickness, then good results are obtained if said composition comprises essentially 100 parts by weight of a hydraulic cement, up to 200 parts of sand, up to 200 parts of coarse aggregate, about 5 to 40 parts of a film-forming copolymer of vinyl acetate and at least 1 alpha-olefin having 2 to 3 carbon atoms, and a substantial amount of water, preferably no greater than that required to form a workable paste or plaster. The copolymer may be present in an amount sufficient to provide the hardened cementitious composition with an adhesive strength of at least 200 pounds per square inch, and such adhesive strength may exceed 250 pounds per square inch when the copolymer is formed of a major amount of vinyl acetate. When the cementitious composition is used as a masonry paint or plaster on masonry walls, it is possible to apply relatively thick coating layers. The thickness of the cementitious composition applied to vertical masonry walls such as those made of brick or concrete blocks may be as much as 0.2 to 0.3 inch.

Such coatings may be applied easily and are very desirable for covering the masonry walls of new buildings or covering old masonry walls which have been thoroughly cleaned.

Where the copolymer has depending carboxyl groups obtained from an acid comonomer or by hydrolysis of a cyanide group, it will have improved adhesion to cementitious and metallic surfaces.

In the cementitious compositions of this invention, the amount by weight of cement is preferably at least several times the amount by weight of the vinyl acetate-alkylene copolymer. The amount of the hydraulic cement is at least 3 times and no more than 40 times the amount by weight of the copolymer and is preferably no more than 25 times the amount by weight of the copolymer. The amount of cement should be sufficient to provide the desired hardness, wear resistance and compressive strength and the amount of copolymer should be sufficient to provide the necessary tensile strength and adhesive strength and the necessary resistance to damage by hydrolysis. The amount of the copolymer is preferably sufficient to materially increase the tensile strength and adhesive strength of the cement material after it has set, and this is particularly true when repairing damaged concrete floors or covering old or damaged masonry walls.

A substantial amount of water must be employed in the cementitious composition in order to hydrate the cement and to provide a consistency suitable for working or spreading of the material. If the copolymer is added to the hydraulic cement in the form of a latex having a solids content of, for example, 30 to 80 percent, then it will probably be necessary to add additional water in order to form a paste which can be readily shaped or spread to form the desired surface. An excessive amount of water is, of course, undesirable.

The cement compositions of this invention are particularly well suited for repairing damaged concrete or masonry surfaces. According to the process of this invention, the surface to be repaired is first thoroughly cleaned, as for example, by using a strong alkali or a dilute acid to remove grease. The surface is preferably moistened thoroughly with water in preparation for patching. Thereafter the cementitious paste of this invention may be troweled into place or otherwise spread to form a layer of substantial thickness (i.e., at least 0.1 inch) and allowed to harden or set. A similar procedure may be used for covering old masonry walls.

The terpolymers, tetrapolymers, pentapolymers and other copolymers used in the cementitious compositions of this invention preferably have a relatively small particle size (i.e., 0.1 to 1.0 micron), but it will be understood that the particle size can vary considerably.

*Example I*

A latex of a film-forming copolymer of ethylene and vinyl acetate is prepared using the following recipe:

| | Parts by weight |
|---|---|
| Ethylene | 25 |
| Vinyl acetate | 75 |
| Deionized water | 160 |
| Emulsifier (octylphenoxy-polyethoxyethanol [1]) | 7 |
| Initiator (ammonium persulfate) | 1 |
| Colloidal suspension of hydrogenated palladium [2] | Trace |

[1] (About 30 ether groups.)
[2] (About .00001 to .0001 part.)

A batch system is used, and all of the ingredients are mixed together and polymerized in a high pressure reactor equipped with a mechanical stirrer at a temperature of 50° C. and a pressure of 600 pounds per square inch with continuous agitation until about 95 percent of the monomers are polymerized. The pressure in the reactor is then reduced and the resulting copolymer latex is removed from the reactor.

A latex made in this manner and having a solids content of 35 percent is then used to form a masonry paint or plaster using the following recipe:

| | Parts by weight |
|---|---|
| White Portland cement | 100 |
| Ottawa sand (AFA 70) | 50 |
| Latex (35% solids) | 35 |
| Soluble casein (40% aqueous solution) | 4.5 |
| Anti-foaming agent (waxy alcohol) | 0.5 |

The mixture is diluted with small amounts of water to provide the needed workability so that it can be applied as a wall paint or plaster on walls made of cement blocks or bricks. The paint is found to have excellent adhesive strength, tensile strength and acid resistance and can be applied successfully in relatively thick layers.

*Example II*

A masonry paint is prepared using the same recipe as in Example I except that the water is removed from the copolymer latex and from the soluble casein in a conventional spray drier before the ethylene-vinyl acetate copolymer is used to form the paint. The dry ingredients are then mixed together and the necessary amount of water is added to form a workable paint. Again excellent results are obtained.

The copolymer prepared as in Example I can readily be spray dried and, therefore, has a distinct advantage over polyacrylate emulsions previously used in cementitious masonry paints.

*Example III*

Another latex of a copolymer of ethylene and vinyl acetate is prepared using the following recipe:

| | Parts by weight |
|---|---|
| Ethylene | 50 |
| Vinyl acetate | 50 |
| Deionized water | 160 |
| Ammonium persulfate | 1 |
| Emulsifier (as in Example I) | 7 |
| Colloidal suspension of hydrogenated palladium | Trace |

A batch system is used and all of the ingredients are polymerized in a high pressure reactor of the type used in Example I at a temperature of 80° C. and a pressure of 600 pounds per square inch with continuous agitation until about 95% of the monomers are converted to polymers. The pressure in the reactor is then reduced and the resulting copolymer latex is removed from the reactor and spray dried in a conventional manner to provide a dry copolymer material. This material is then used to form a masonry composition using the same recipe as in Example I. The material has good adhesive strength, good tensile strength and good acid resistance and is superior to the composition of Example I in its resistance to damage by hydrolysis because of the increased percentage of ethylene. However, the adhesive strength and tensile strength is not as good as the copolymer of Example I.

*Example IV*

Another copolymer latex is prepared using the following recipe:

| | Parts by weight |
|---|---|
| Ethylene | 49 |
| Vinyl acetate | 50 |
| Methacrylic acid | 1 |
| Deionized water | 160 |
| Ammonium persulfate | 1 |
| Emulsifier (as in Example I) | 7 |
| Colloidal suspension of hydrogenated palladium | Trace |

The above ingredients are polymerized using the procedure of Example I. The resulting copolymer latex is spray dried and used to form a masonry composition using the same recipe as in Example I. Again excellent results are obtained.

Example V

Another copolymer latex is prepared using the following recipe:

| | Parts by weight |
|---|---|
| Ethylene | 75 |
| Vinyl acetate | 25 |
| Deionized water | 160 |
| Ammonium persulfate | 1 |
| Emulsifier (same as in Example I) | 7 |
| Colloidal suspension of hydrogenated palladium | Trace |

Again a batch system is used and the ingredients are polymerized in a reactor of the type used in Example I at a temperature of 50° C. and a pressure of 600 pounds per square inch with continuous agitation until about 95% of the monomeric material is converted to a polymerizate. The polymerizate is then removed from the reactor after the reactor has been vented to atmosphere.

A latex made in this manner and having a solids content of 35% is then used to form a topping for cement floors of the type used in processing plants using the following recipe:

| | Parts by weight |
|---|---|
| Portland cement (Type I) | 667 |
| Best sand | 333 |
| Latex (35% solids) | 167 |
| Ammonium caseinate | 14 |
| Antifoaming agent (waxy alcohol) | 1 |
| Water reducing agent (sodium lignosulfonate) | 3 |
| Crushed trap rock | 1,000 |

In order to mix the above ingredients, all of the ingredients except the trap rock, sand and cement are placed into a mixer with additional amounts of water as needed to provide the workability. Then the trap rock is added, and thereafter the sand is added. The last step is to add the Portland cement. These materials are mixed in a conventional manner and used as a topping for a cement floor in a processing plant. It is found that the topping has excellent adhesion to the underlying cement and has excellent tensile strength and acid resistance. Also, the topping is not damaged substantially due to the fact that the floor is constantly wet because the latex is more hydrophobic than the latex of Example I, for example.

In each of the above examples, the copolymer of ethylene and vinyl acetate may be replaced by similar copolymers of 25 to 75% ethylene, 75 to 25% vinyl acetate and a small amount (i.e., 1 to 5% of a copolymerizable monoethylenically unsaturated carboxylic acid (i.e., acrylic acid, methacrylic acid, maleic anhydride, etc.).

In each of the above examples, the polymerization may be carried out at various pressures up to or exceeding 2500 pounds per square inch and at various temperatures (i.e., between 50° C. and 150° C.) for different periods of time. Various catalysts may be used. The polymerization can be carried out to various conversions, but it is preferable to convert about 60 to 99 percent by weight of the monomers to polymers. It is also preferable to maintain the solids content below 50 percent during polymerization. Instead of using a batch system, a continuous system or a delayed addition system may be used. In the continuous or semi-continuous system, the monomers are added continuously and the copolymers are removed as they are formed. In the delayed-addition system a part only of the monomers is added initially and the remainder is added during polymerization.

While the examples disclose copolymers of vinyl acetate and ethylene only, it will be understood that at least part of the ethylene may be replaced with propylene and that small amounts of other copolymerizable monomers may be employed, such as ethyl and higher alkyl acrylates, particularly propyl acrylate, 2-ethyl hexyl acrylate and butyl acrylate, alkyl methacrylates, nitriles, such as acrylonitrile, esters of dicarboxylic acids, such as diethyl fumarate or diethyl maleate, or other vinyl monomers.

The monomers should be selected to provide the desired tensile strength, adhesive strength and resistance to hydrolysis and to provide a film-forming copolymer or copolymerization product. As that term is used in this application a "film-forming" copolymer is one which, when saturated with water, forms a film at room temperature or below or at a temperature not in excess of 25° C. Those copolymers which, when wet, give a powder-like product rather than film at 25° C. are excluded by the term "film-forming" as herein used.

In my copending application Ser. No. 432,831, filed Feb. 15, 1965, it is pointed out that there is another latex which can be used to replace the polyvinylacetate-ethylene copolymer latex. There can be used a latex of a copolymer of ethylene oxide and propylene oxide prepared, for example, by polymerization in solution using, for example, a catalyst as described in Bailey Patent No. 3,031,-439 and emulsifying the polymer solution obtained. A low boiling hydrocarbon solvent such as heptane or hexane may be used, and the resulting polymer, while diluted in solvent, may be emulsified in water, preferably using a non-ionic emulsifier and the solvent thereafter removed to provide a latex which is especially desirable for use in cement compositions. Excellent results can be obtained, for example, where the monomer is 50% by weight propyleen oxide and 50% ethylene oxide. Again the amount of the hydraulic cement would preferably be about 3 to 25 times the amount by weight of the copolymer.

It will be understood that, unless the context shows otherwise, the terms "polymer" and "copolymer" are used in the generic sense to include terpolymers, tetrapolymers and other copolymers. It will also be apparent that, unless the context shows otherwise, all percentages are by weight, and "parts" means parts by weight.

The above description is by way of illustration rather than limitation, and, in accordance with the provisions of the patent laws, variations and modifications of the specific methods, compositions and products disclosed herein may be made without departing from the spirit of the invention.

Having described my invention, I claim:

1. A cementitious composition comprising a finely divided hydraulic cement and a minor amount by weight of a water-insoluble film-forming copolymer of 20 to 80 percent by weight of vinyl acetate and at least 20 percent by weight of at least one alpha-olefin having 2 to 3 carbon atoms.

2. A cementitious composition as defined in claim 1 wherein the amount by weight of said cement is about 3 to 40 times the amount by weight of said copolymer.

3. A composition as defined in claim 2 wherein the polymer chain of said copolymer has a minor amount of depending carboxyl groups.

4. A free-flowing predominantly cementitious composition as defined in claim 1 for producing a rigid material of high adhesive strength comprising sand, said hydraulic cement and said copolymer, the ratio of sand to cement being from about 3:1 to about 1:3, the amount by weight of said cement being about 3 to 40 times the amount by weight of said copolymer.

5. A masonry paint composition of high adhesive strength as defined in claim 4 wherein said copolymer is a copolymerization product of 40 to 80 percent by weight of vinyl acetate and 20 to 60 percent by weight of at least one said alpha-olefin.

6. A free-flowing masonry composition as defined in claim 4 for making a concrete of high adhesive strength, said copolymer being a copolymerization product of 20 to 60 percent by weight of vinyl acetate and 80 to 40 percent by weight of at least one said alpha-olefin.

7. A masonry composition as defined in claim 6 wherein said copolymer is a copolymerization product of at least 40 percent by weight of vinyl acetate and no more than 60 percent by weight of said alpha-olefin.

8. A cementitious composition as defined in claim 1 wherein said copolymer is a copolymerization product of about 25 to 75 percent by weight of vinyl acetate and about 75 to 25 percent by weight of at least one said alpha-olefin.

9. A cementitious composition as defined in claim 8 wherein the alpha-olefin of said copolymer comprises ethylene.

10. A composition as defined in claim 8 wherein said copolymer is a copolymerization product of about 25 to 75 percent by weight of vinyl acetate, about 75 to 25 percent by weight of an alpha-olefin selected from the group consisting of ethylene, propylene and mixtures thereof, and at least 0.5 percent by weight of a copolymerizable ethylenically unsaturated carboxylic acid.

11. A cementitious composition as defined in claim 10 wherein said carboxylic acid is an acrylic acid having 3 to 4 carbon atoms.

12. A cementitious composition as defined in claim 10 wherein said copolymer is a copolymerization product of about 25 to 75 percent by weight of vinyl acetate, about 75 to 25 percent by weight of ethylene, and about 0.5 to 4 percent by weight of a copolymerizable acrylic acid having 3 to 4 carbon atoms.

13. A cementitious composition as defined in claim 10 wherein said copolymerizable acid is a dicarboxylic acid having 4 carbon atoms.

14. A cementitious composition as defined in claim 10 wherein said copolymerizable acid is selected from the group consisting of acrylic acid, methacrylic acid, maleic anhydride, fumaric acid, itaconic acid, monoesters of maleic acid, monoesters of fumaric acid, monoesters of itaconic acid, and mixtures thereof.

15. A cementitious composition comprising 100 parts by weight of a hydraulic cement and about 5 to 30 parts by weight of a film-forming copolymer of about 25 to 75 percent by weight of vinyl acetate and about 75 to 25 percent by weight of at least one alpha-olefin having 2 to 3 carbon atoms.

16. A cementitious composition as defined in claim 15, wherein said copolymer is a copolymerization product of about 25 to 75 percent by weight of vinyl acetate, about 75 to 25 percent by weight of ethylene, and about 0.5 to 10 percent of a copolymerizable ethylenically unsaturated carboxylic acid having 3 to 4 carbon atoms.

17. A composition as defined in claim 16, wherein said copolymer is a copolymerization product of vinyl acetate, ethylene and about 0.5 to 4 percent by weight of an acrylic acid having 3 to 4 carbon atoms.

18. A cementitious composition as defined in claim 15 comprising a substantially dry mixture of said cement and said copolymer.

19. A cementitious composition as defined in claim 1 for making a hard rigid coating comprising essentially 100 parts by weight of a hydraulic cement, up to 200 parts of sand, up to 200 parts of coarse aggregate, about 5 to 40 parts of a film-forming copolymer of 20 to 80 percent by weight of vinyl acetate and 80 to 20 percent of at least one alpha-olefin having 2 to 3 carbon atoms to increase materially the resistance to hydrolysis by aqueous media and to attack by acids, and an amount of water not substantially greater than that required to form a free-flowing paste.

20. A composition as defined in claim 19 wherein said copolymer is a copolymer at least 40 percent by weight of vinyl acetate and up to 60 percent by weight of ethylene and is present in an amount sufficient to provide said coating with an adhesive strength of at least 200 pounds per square inch.

21. A strong hard acid-resistant material comprising a hydraulic cement, combined water in an amount sufficient to hydrate said cement, and a minor amount of a film-forming copolymer of 20 to 80 percent by weight of vinyl acetate and 80 to 20 percent by weight of at least one alpha-olefin selected from the group consisting of ethylene, propylene and mixtures thereof.

22. A rigid concrete as defined in claim 21 comprising a major amount of said cement and sand, the ratio of sand to cement being from about 3:1 to about 1:3, and combined water in an amount sufficient to hydrate said cement, said copolymer being a copolymerization product of about 20 to 60 percent by weight of vinyl acetate and about 80 to 40 percent by weight of at least one said alpha-olefin, said copolymer being present in a substantial amount to increase materially the resistance of the concrete to hydrolysis by aqueous media and to attack by acids, the amount of said cement being at least several times the amount by weight of said copolymer.

23. A concrete as defined in claim 22 wherein the ratio of sand to cement is from about 1:1.8 to about 1:2.5 and the concrete contains an amount of coarse aggregate in excess of the amount of cement.

24. A strong rigid wall coating as defined in claim 21, said wall coating comprising a layer covering the face of a vertical masonry wall.

25. A combination as defined in claim 24, wherein said masonry wall is formed of concrete blocks and said covering layer has a thickness of about 0.2 to about 0.3 inch.

26. A hardenable cementitious composition comprising a hydraulic cement, water, dispersed particles of a film-forming copolymer of (1) about 75 to 25% by weight of vinyl acetate, (2) 25 to 75% by weight of at least one alpha-olefin having 2 to 3 carbon atoms, and (3) .5% to 10% by weight of a copolymerizable unsaturated carboxylic acid, said composition containing fine aggregate, the ratio of fine aggregate to cement being 3:1 to 1:3, the amount of water being sufficient to permit said composition to be shaped or spread.

27. A composition according to claim 26 wherein the copolymerizable unsaturated acid is an acrylic acid.

28. A composition according to claim 27 wherein the composition also contains coarse aggregate in an amount greater than the weight of the cement.

References Cited

UNITED STATES PATENTS

| | | | |
|---|---|---|---|
| 2,342,400 | 2/1944 | Hopff et al. | 260—29.6 |
| 2,733,995 | 2/1956 | Robinson | 260—29.6 |
| 2,800,463 | 7/1957 | Morrison | 260—29.6 |
| 3,240,766 | 3/1966 | Thomson et al. | 260—87.3 |

FOREIGN PATENTS

| | | |
|---|---|---|
| 582,093 | 11/1946 | Great Britain. |

MURRAY TILLMAN, *Primary Examiner.*

SAMUEL BLECH, *Examiner.*

J. WHITE, *Assistant Examiner.*